(12) United States Patent
Cali et al.

(10) Patent No.: US 9,706,355 B1
(45) Date of Patent: Jul. 11, 2017

(54) SYSTEMS AND METHODS FOR AUTOMATICALLY GENERATING GEOFENCES BASED ON PROPERTY INFORMATION

(71) Applicant: Contagious Atmosphere LLC, Mountain Lakes, NJ (US)

(72) Inventors: Ian L. Cali, Mountain Lakes, NJ (US); Earl Lacsamana, Los Angeles, CA (US)

(73) Assignee: Contagious Atmosphere LLC, Mountain Lakes, NJ (US)

( * ) Notice: Subject to any disclaimer, the term of this patent is extended or adjusted under 35 U.S.C. 154(b) by 0 days.

(21) Appl. No.: 15/235,622

(22) Filed: Aug. 12, 2016

(51) Int. Cl.
*H04W 4/22* (2009.01)
*H04W 4/02* (2009.01)
*H04W 68/00* (2009.01)
*H04W 88/02* (2009.01)

(52) U.S. Cl.
CPC ......... *H04W 4/022* (2013.01); *H04W 68/005* (2013.01); *H04W 88/02* (2013.01)

(58) Field of Classification Search
CPC .... H04W 4/022; H04W 68/005; H04W 88/02
See application file for complete search history.

(56) References Cited

U.S. PATENT DOCUMENTS

| | | | | |
|---|---|---|---|---|
| 2010/0127919 A1* | 5/2010 | Curran | ................. | H04W 4/021 340/573.4 |
| 2010/0148947 A1 | 6/2010 | Morgan et al. | | |
| 2012/0008526 A1 | 1/2012 | Borghei | | |
| 2012/0046040 A1 | 2/2012 | Chatterjee | | |
| 2012/0309413 A1 | 12/2012 | Grosman et al. | | |
| 2012/0319825 A1* | 12/2012 | Shimy | ................. | H04L 12/2818 340/12.5 |
| 2013/0244687 A1 | 9/2013 | Stargardt et al. | | |
| 2014/0066090 A1 | 3/2014 | Henderson | | |
| 2014/0365709 A1 | 12/2014 | Strauss | | |
| 2015/0148060 A1 | 5/2015 | Parab et al. | | |
| 2015/0163626 A1 | 6/2015 | Zimmer | | |
| 2015/0163629 A1 | 6/2015 | Cheung | | |
| 2015/0172861 A1* | 6/2015 | Byun | ................. | H04W 4/021 455/456.3 |
| 2015/0230053 A1* | 8/2015 | Scellato | ................. | H04W 4/021 455/456.3 |
| 2015/0341747 A1* | 11/2015 | Barrand | ................. | G06Q 30/0201 455/405 |
| 2015/0358774 A1 | 12/2015 | Haro et al. | | |
| 2016/0066146 A1 | 3/2016 | Jernigan | | |

* cited by examiner

*Primary Examiner* — Chuong A Ngo
(74) *Attorney, Agent, or Firm* — Beem Patent Law Firm

(57) ABSTRACT

A system for generating a geofence may include a server that receives location data for an area of interest from a client device. In some embodiments, the system may determine at least two boundary coordinates for the area of interest based on the received location data. The system also may determine an anchor point for a geofence and/or a geofence size based on the at least two boundary coordinates. The at least two boundary coordinates may be opposite corners of the area of interest and the anchor point may be a coordinate between the at least two boundary coordinates. The system also may apply an adjustment factor to determine the size of the geofence. The adjustment factor may be determined based on the distance between the at least two boundary coordinates. Other implementations also are described.

20 Claims, 8 Drawing Sheets

SYSTEMS AND METHODS FOR AUTOMATICALLY GENERATING GEOFENCES BASED ON PROPERTY INFORMATION

BACKGROUND OF THE INVENTION

1. Technical Field

The present application relates to systems and methods for geofencing, and more particularly, to systems and methods for improving the accuracy of geofences for specified locations.

2. Related Art

A geofence is a virtual perimeter for a real-world geographic area. A geofence may be dynamically generated—as in a radius around a store or point location—or a geofence can be a predefined set of boundaries, like school attendance zones or neighborhood boundaries. Geofences typically are used to trigger an event when the perimeter is breached. For example, a person may set a radius around his/her house, usually through a software application; the owner may be informed when his dog, wearing a location-aware collar, goes beyond this set perimeter.

Another example is an ankle monitor that may be used for monitoring criminals under house arrest. An ankle monitor may send a signal containing location and other information to a receiver. If the person being tracked moves outside of an allowed range, the police may be notified. Some ankle monitors also are used to monitor violations of restraining orders—in this case the wearer of the monitors are not allowed to breach the set geofence.

Geofences are a great innovation in tracking, however the timeliness and accuracy of the triggers are greatly dependent on their placement and size. Ideally, the geofence should encompass the entire area of interest. Gaps in coverage or overlaps to other areas may result in false positive triggers or no triggering at all, both of which are problematic for products and services that rely on location accuracy or geofence triggers.

Currently, geofences are set manually or dynamically. Manually setting a geofence is a laborious process that demands the person establishing the geofence have detailed knowledge of the area of interest. For example, to manually establish a geofence, a person typically must (1) determine and record the center of the area of interest, (2) determine and record the radius of the geofence, (3) enter this information into an application, and (4) set the type of trigger in the application. Thus, a person is required to know the coordinates of the location, or use a visual representation of the location, such as a map. Even if this information and man-power is available, manually establishing a geofence for a non-stationary area of interest, such as a mobile device, is difficult and impractical.

Applications that assist a user in manually generating a geofence typically use a common method of geofencing where the user chooses a desired destination and then manually chooses the size and positioning of the geofence on a map. The user may be prompted to choose a geofence radius in set increments, such as 500 feet (ft.), 1000 ft., 0.5 miles (mi), 1 mi, 2 mi or other predefined size. The user then may move the geofence freely on the map. Although this may work for some users and purposes, this method as a whole is limited and inefficient as users often run in to the same issues where the trigger either happens prematurely or not at all. An additional layer of complication in current methods is the fact that they need a user to orient a geofence in the correct place. This leaves room for extensive errors on the user's part, leading to false positives or non-triggers that in turn makes the product or service associated with the geofence to be inefficient as well.

To alleviate the burden of manual geofencing, some systems dynamically generate geofences. In a typical scenario, these data providers may determine a latitude and longitude for an area of interest through a method called address interpolation where a proximate location for an area of interest is inferred from its address. For example, 750 Main Street may be estimated to be half-way between $7^{th}$ Avenue and $8^{th}$ Avenue on Main Street. However, address interpolation results in poorly determined latitudes and longitudes that often may be off by hundreds of meters. As a result, a user may be standing directly at the point of interest and not trigger the geofence.

Accordingly, a need has long existed for improved systems and methods for geofencing.

SUMMARY

In one embodiment, a system for generating a geofence may include a server that receives location data for an area of interest from a client device. The location data may be an address, a geographic coordinate, or the like. In some embodiments, the system may determine at least two boundary coordinates for the area of interest based on the received location data. The system also may determine an anchor point for a geofence and/or a geofence size based on the at least two boundary coordinates. The at least two boundary coordinates may be opposite corners of the area of interest and the anchor point may be a coordinate between the at least two boundary coordinates.

Optionally, the system may query a geocoding service to determine boundary conditions from an address and/or a reverse geocoding service to determine an address from a specific coordinate. The geocoding service and reverse geocoding service may be internal services or external services provided by one or more third parties.

In some embodiments, the system also may determine an adjustment factor based on the at least two boundary coordinates and determine a geofence size based on the adjustment factor. The adjustment factor may be determined based on the distance between the at least two boundary coordinates.

In some embodiments, the system also may include a trigger detection component that determines if a geofence trigger event has occurred. For example, the system may receive location data for an area of interest and location data for a mobile device. The system may determine a geofence for the area of interest based on its location data and also may determine if the geofence has been triggered by the mobile device. As another example, the system may store information about predefined areas of interest. The predefined area of interest information may include location data from which a geofence may be determined and/or may include a predetermined geofence for the respective area of interest. The system then may receive location data for a mobile device and determine if the mobile device has triggered the stored, predetermined geofence.

Other systems, methods, features, and technical advantages of the invention will be, or will become apparent to one with skill in the art upon examination of the following figures and detailed description. It is intended that all such additional systems, methods, features, and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the geofencing system architecture may be stored on, distributed across, or read from other machine-readable media, for example, secondary storage devices such as hard disks, floppy disks, and CD-ROMs; a signal received from a network; other forms of ROM or RAM either currently known or later developed; and the like.

Furthermore, although specific components of the communications architecture will be described, methods, systems, and articles of manufacture consistent with the geofencing system architecture may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways, including unstructured data. Programs may be parts of a single program, separate programs, or distributed across several memories and processors. Systems may be implemented in hardware, software, or a combination of hardware and software in one processing system or distributed across multiple processing systems.

1.0 Exemplary Geofencing System Overview

Figure 1:
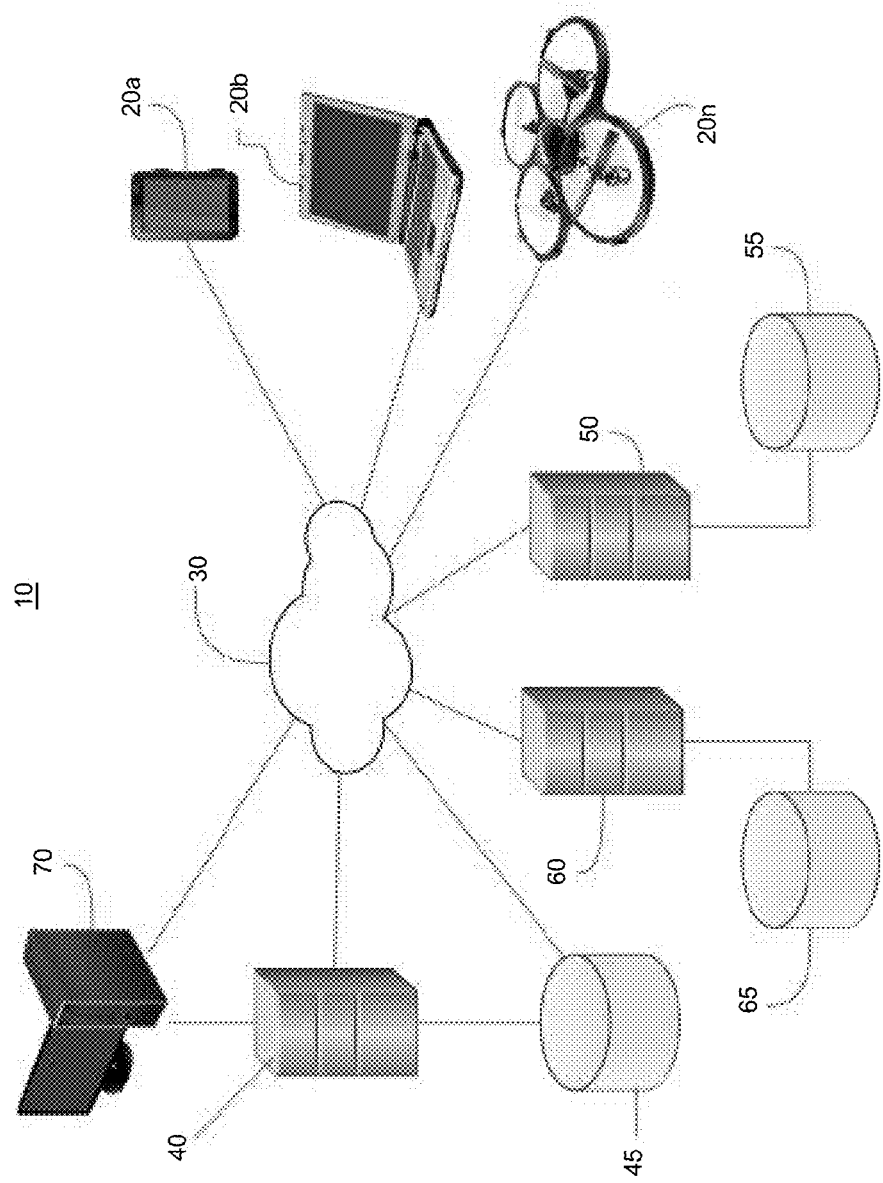
FIG. 1 shows an exemplary physical architecture for an exemplary system for geofencing.

Referring to FIG. 1, an exemplary architecture 10 for a system for geofencing reviews is shown. One or more client devices may run client applications 20a-n that may communicate with a geofencing server 40 via a communications network 30 (shown as an exemplary Internet cloud). The client devices 20a-n may provide location information to the server 40. In response, the server 40 may generate a geofence based on the received information. The server 40 may store information in a database 45 and also may provide an administration interface 60 that enables an administrator to interact with the server 40. In some embodiments, geofencing server 40 may be in communication with one or more additional servers, such as reverse geocoding server 50 and/or geolocation server 60, which each may store information in respective databases 55 and 65.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, although figuratively attached to the geofencing server 40, the database 45 may, in practice, distribute user-specific data elements directly to one or more client systems 20a, 20b, and 20n. As another example, the geofencing server 40 may be implemented as a single server configured to provide all of the system's functionalities, or the functionalities may be implemented across multiple servers. Similarly, although geofencing server 40, geolocation server 60 and reverse geocoding server 50 are shown as separate devices, they may be implemented as a single server configured to provide all of the system's functionalities, or the functionalities may be implemented across multiple servers as shown owned and/or operated by one or more entities.

1.1 Exemplary Client Devices 20a-n

The client devices 20a-n may provide a user interface for the system 10 and may communicate location data and other information with the geofencing server 40 via communications network 30. In one embodiment, client devices 20a-n may comprise stand-alone applications which may be either platform dependent or platform independent. For example, client devices 20a-n may be stand-alone applications for a mobile phone configured to run on a mobile operating system such as the iOS™ operating system from Apple Inc. located in Cupertino, Calif., the Android™ operating system from Google, Inc. located in Mountain View, Calif., or the like. Alternatively, or additionally, client systems 20a-n may connect to the server 40 via the Internet using a standard browser application. Alternatively, or additionally, one or more of the client devices 20a-n may be an application configured to run on desktop or mobile computer such as a laptop computer, handheld computer, tablet, mobile messaging device, or the like which may all utilize different hardware and/or software packages. As another example, client functionality may be provided by via an embedded chip(s) integrated into a client device 20a-n. Other methods may be used to implement the client devices 20a-n.

Exemplary client devices 20a-n may include mobile phones, smart vehicles and smart wearables such as the Apple Watch™ (provided by Apple, Inc. located in Cupertino, Calif.), fitness trackers, Google Glass™ (provided by Google, Inc. of Mountain View, Calif.) and the like. Other exemplary client devices 20a-n may include computer chips embedded into: luggage; container vans; vehicles; credit cards; safety deposit boxes; trains; buses; rental cars; research vessels; drones; livestock trackers; pet and animal collars; event ticket, wristbands and lanyards (such as used at amusement parks or concerts); medical alert wristbands used in hospitals, senior citizen homes, and mental institutions; emergency vehicles; rental items that are intended to be bound to a particular premise, such as bikes, boats, jet skis, surf boards, golf cart and the like that may be used at a resort; armored cars and money bags; valuables such as artwork, jewelry boxes and safes; and the like. Other client devices 20a-n also may be used.

1.2 Exemplary Communications Networks 30

The communications network 30 may be any type any private or public communication network, such as the Internet, and may include one or more communications networks. In some embodiments, the communications network 30 may be a cellular network such as, for example, a Code Division Multiple Access (CDMA) network, Global System for Mobiles (GSM) network, General Packet Radio Service (GPRS) network, cdmaOne network, CDMA2000 network, Evolution-Data Optimized (EV-DO) network, Enhanced Data Rates for GSM Evolution (EDGE) network, Universal Mobile Telecommunications System (UMTS) network, Digital Enhanced Cordless Telecommunications (DECT) network, Digital AMPS (IS-136/TDMA), Integrated Digital Enhanced Network (iDEN), third generation (3G) wireless mobile telecommunications networks that comply with the International Mobile Telecommunications-2000 (IMT-2000) specifications, fourth generation (4G) wireless mobile telecommunications networks, Long-Term Evolution (LTE) wireless mobile telecommunications networks, and the like. As further examples, the communications network 30 may be a wireless network based on one or more of the Institute of Electrical and Electronics Engineers' (IEEE) 802.11 standards, referred to generally as WiFi. Other types of communications networks 30 also may be used.

1.3 Exemplary Geofencing Server 40

The geofencing server 40 may store geofence and related information in a database 45, receive location information from a client device 20a-n, communicate with various service providers (such as geolocation and reverse geocoding service providers 60 and 50), provide a user interface for an administration application 70 that enables an administrator to interact with the server 40, and the like. In operation, the geofencing server 40 may receive location data from client devices 20a-n and may, in response, determine geofence data, such as a geofence anchor point and/or size, for the given location. In some embodiments, the geofencing server 40 also may determine if the client device 20a-n is within a particular geofence, which may correspond to an area of interest for which location information is provided by the client device 20a-n or which may be retrieved from other sources, such as database 45. As should be apparent to one of ordinary skill in the art from the disclosure herein, other related services may also be provided.

In some embodiments, the geofencing server 40 and database 45 may comprise one or more instances of an Amazon Elastic Compute Cloud™ (Amazon EC2™) Web Server (Amazon™) utilizing one or more of the following storage mechanisms: Amazon Simple Storage Service™ (Amazon S3™), Amazon Relational Database Service™ (Amazon RDS™), Amazon SimpleDB™, Amazon Simple Queue Service™ (Amazon SQS™) and/or other storage mechanisms.

The database 45 may store a variety of information, including geofencing information, geofence size adjustment information, entity information, information about points of interest, lists of points of interests associated with entities and the like. In some embodiments, all information stored in the database 45 is encrypted.

1.4 Exemplary Reverse Geocoding Services

The reverse geocoding service 50 may determine an address from a specific coordinate, such as a specific latitude and longitude, based on information stored in the database 55. For example, the reverse geocoding database 55 may include addresses, primary coordinates, boundary coordinates and the like for properties and/or locations of interest. The address may be derived mathematically, retrieved from a stored dataset of addresses and coordinates, or by other methods. For example, estimated address may be interpolated from a range of addresses assigned to a road segment in a reference dataset nearest the coordinate. Other methods also may be used to derive an address mathematically.

The reverse geocoding service 50 may be an internal service, an external or third-party service, or a combination of internal and external services. Exemplary third party reverse geocoding services 50 include BING MAPS provided by Microsoft Corporation of Redmond, Wash., GOOGLE MAPS provided by Google, Inc. of Mountain View, Calif., MAPBOX GEOCODING provided Mapbox of San Francisco, Calif. Other external services also may be used.

1.5 Exemplary Geolocation Services

The geocoding service 60 may determine boundary conditions from an address based on property information stored in the database 65. For example, the geocoding database 65 may include addresses, primary coordinates, boundary coordinates and the like for properties and/or locations of interest. In some embodiments, the geocoding database 65 and the reverse geocoding database 55 are the same database. In some embodiments, the geocoding service may receive an address and return associated boundary coordinates from the database 65.

The geocoding service 60 may be an internal service, an external service, or a combination of internal and external services. Exemplary third party reverse geocoding services 50 include BING MAPS provided by Microsoft Corporation of Redmond, Wash., GOOGLE MAPS provided by Google, Inc. of Mountain View, Calif., MAPBOX GEOCODING provided Mapbox of San Francisco. Other external services also may be used.

1.6 Exemplary Administrative Application 70

In some embodiments, the system 10 may include an administration application 70. The administration application 70 may be provided by the geofencing server 40, for example, as a stand-alone application running on a computer such as a workstation computer, laptop computer, handheld computer, tablet, mobile messaging device, or the like which may all utilize different hardware and/or software packages. Alternatively, or additionally, administration application 70 may connect to the server 40 via the Internet using a standard browser application. A browser based implementation allows system features to be accessible regardless of the underlying platform of the administration application 70. Other methods may be used to implement the administration application 460. In operation, the administration application 70 may provide a framework that allows an administrator to establish and manage entity profiles and associated locations, manage geofencing data, establish and manage adjustment factors, and the like. As should be apparent to one of ordinary skill in the art from the disclosure herein, other related features also may be provided.

2.0 Exemplary Determination of a Geofence

Figure 2:
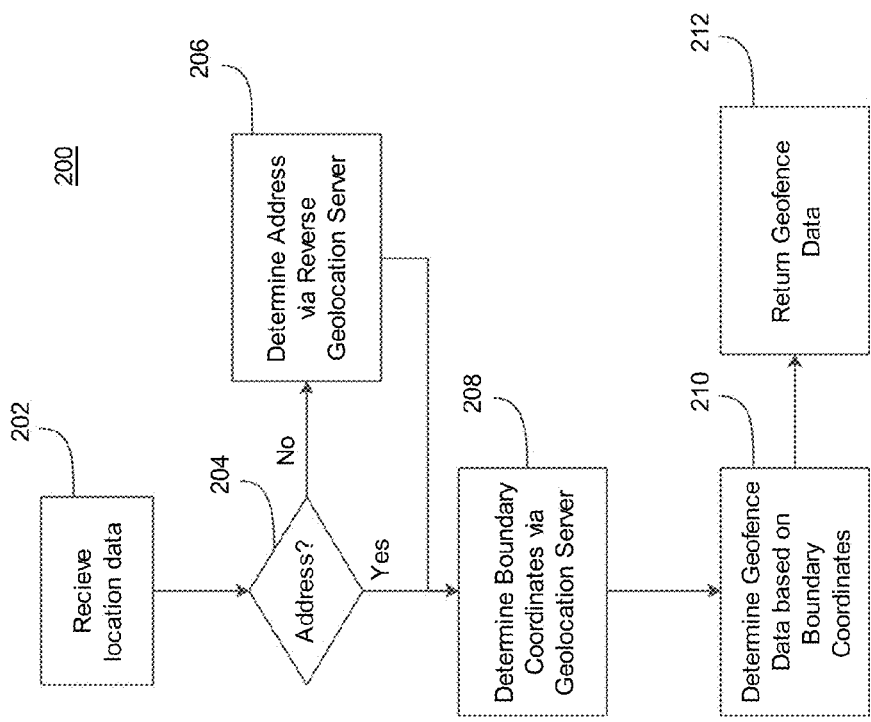
FIG. 2 shows a flowchart for an exemplary process for determining a geofence for an area of interest.

Referring to FIG. 2, a flow chart for an exemplary process 200 for determining a geofence for an area of interest is shown. This process is described also with reference to FIGS. 3a-b, which show an exemplary map 300 with and without visual indicators of boundary coordinates 320a and 320b and various components of a circular geofence 310. As described above, geofencing server 40 may receive location data for an area of interest from a client application 20a-n at step 202. The received location data may be an address, a geographic coordinate, or the like. For example, the location data may be sent by the device at timed intervals, upon opening of or selection of an interface control in a client application 20a-n, when a significant change in location occurs (such as via the significant-change location service included in the location services of iOS provided by Apple, Inc. of Cupertino, Calif.) or the like.

Figure 3A:
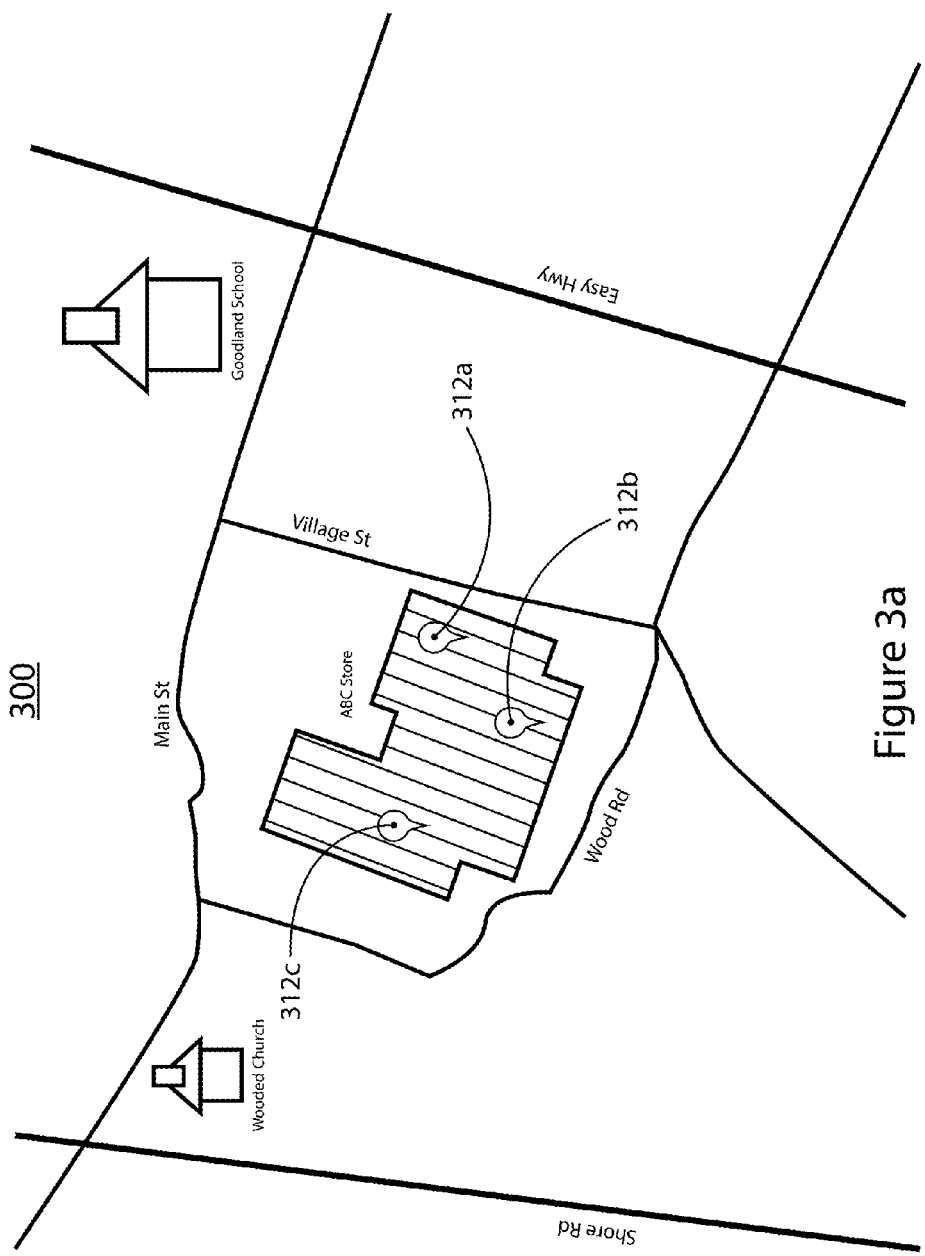
FIG. 3a shows an exemplary map including an area of interest or target location for a geofence.

At step 204, the server 40 may determine if the location data is an address or a geographic coordinate, such as a current latitude and longitude for a cellular phone. If the received location data is a geographic coordinate, the server 40 may determine an address associated with the geographic coordinate at step 206. For example, the server 40 may provide the coordinate to a reverse geocoding service 50, and, in response, the reverse geocoding service 50 may return an address. As shown in FIG. 3a, a device may provide a number of difference coordinates 312a, 312b, and 312c that may be determined to correspond to the address of the location of interest. In the illustrated embodiment, the client device 20a may provide a coordinate of the location of interest as latitude 34.1424794, longitude −118.2117143, which is a store that is determined to have an address of "123 Main St."

At step 208, the server 40 may determine at least two boundary coordinates for the area of interest based on the address. The boundary coordinates may be geographic coordinates designating points along a boundary, or edge, of an area of interest. For example, a boundary coordinate 320a may be a point coinciding with a property line, a point coinciding with an external wall of a building, a point coinciding with an internal wall of a building, or the like. In some embodiments, the server 40 may query a geocoding service 60 and, in response, the geocoding service 60 may return, inter alia, coordinates 320a and 320b for two corners of a property associated with the address, such as coordinates for the opposite corners of a property. Other boundary coordinates may be used. In the example illustrated in FIG. 3b, boundary coordinates 320a and 320b correspond to a Northwest corner and Southeast corner of the location of interest, respectively.

Figure 3C:
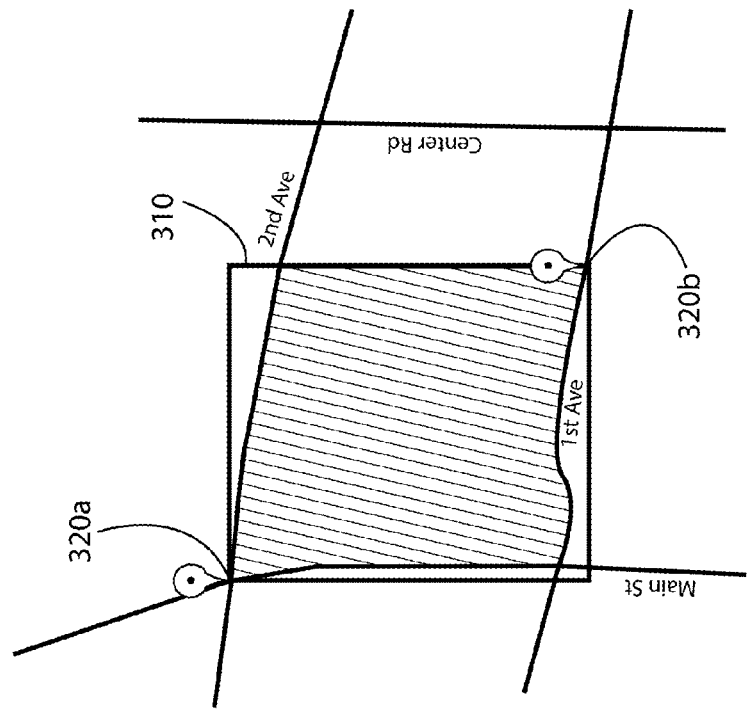
FIG. 3c shows another exemplary map along with visual indicators of boundary coordinates and a rectangular geofence.
Figure 3B:
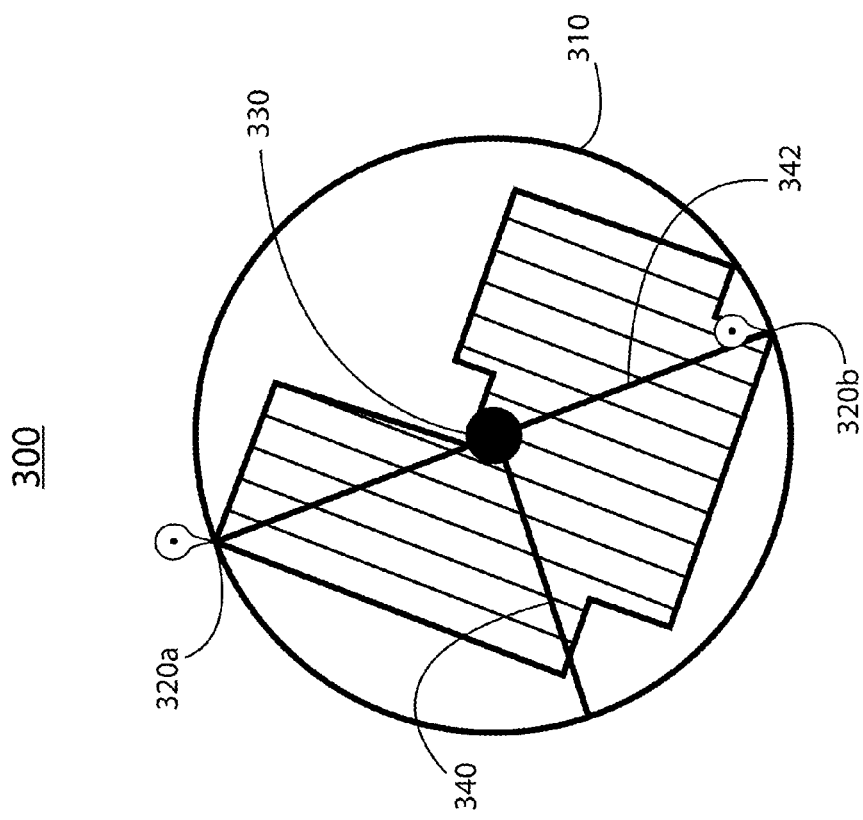
FIG. 3b shows the exemplary map of FIG. 3a along with visual indicators of boundary coordinates and various components of a circular geofence.

In the example illustrated in FIG. 3b, the server 40 may provide the address "123 Main St., Los Angeles, Calif." to a geocoding service 60. In response, the geocoding service 60 may return boundary coordinates 320a and 320b for the Northwest corner 320a and Southeast corner 320b of the property. In the illustrated embodiment, these boundary coordinates may be a latitude of 34.138961 and a longitude of −118.213935 for the Northwest corner 320a of the property and at a latitude of 34.138811 and a longitude of −118.21373 for the Southeast corner 320b of the property.

The server 40 may determine, based on the at least two boundary coordinates, geofence data at step 210. The geofence data may include a variety of information, such a geofence shape, a geofence size 340, and/or a geofence anchor point 330 as described below. The determined geofence data may be returned (transmitted) to the requesting device at step 212.

A geofence 310 may be any of a variety of shapes. For example, a geofence 310 may be circular, rectangular, square, or comprise any other polygonal shape. The geofence data may include different components depending on the shape of the geofence 310. For example, data for a rectangular geofence 310 may include two coordinates that comprise opposite corners of a point of interest, and the geofence 310 may be triggered if a device's current location has latitude and longitude values between those of the corner coordinates 320a and 320b. In another embodiment, a rectangular geofence may include an anchor point along with a height and length. Other information may be used to describe a rectangular geofence.

As another example, a circular geofence 310 may include an anchor point (such as a center) and a size (such as a radius). In some embodiments, the anchor point 330 and size 340 of the geofence 310 may be independent of one another and may be determined in any order. In other embodiments, the anchor point 330 and size 340 of the geofence 310 may be dependent on one another and may be determined in a specific order. For example, in some embodiments, different methodologies for determining the location of the anchor point 330 may be used depending on certain factors such as the size 340 of the geofence, the distance between the boundary coordinates 320a and 320b, or other factors. In such embodiments, the order of operation may be dictated by those factors.

2.1 Exemplary Determination of a Geofence Anchor Point

Figure 4:
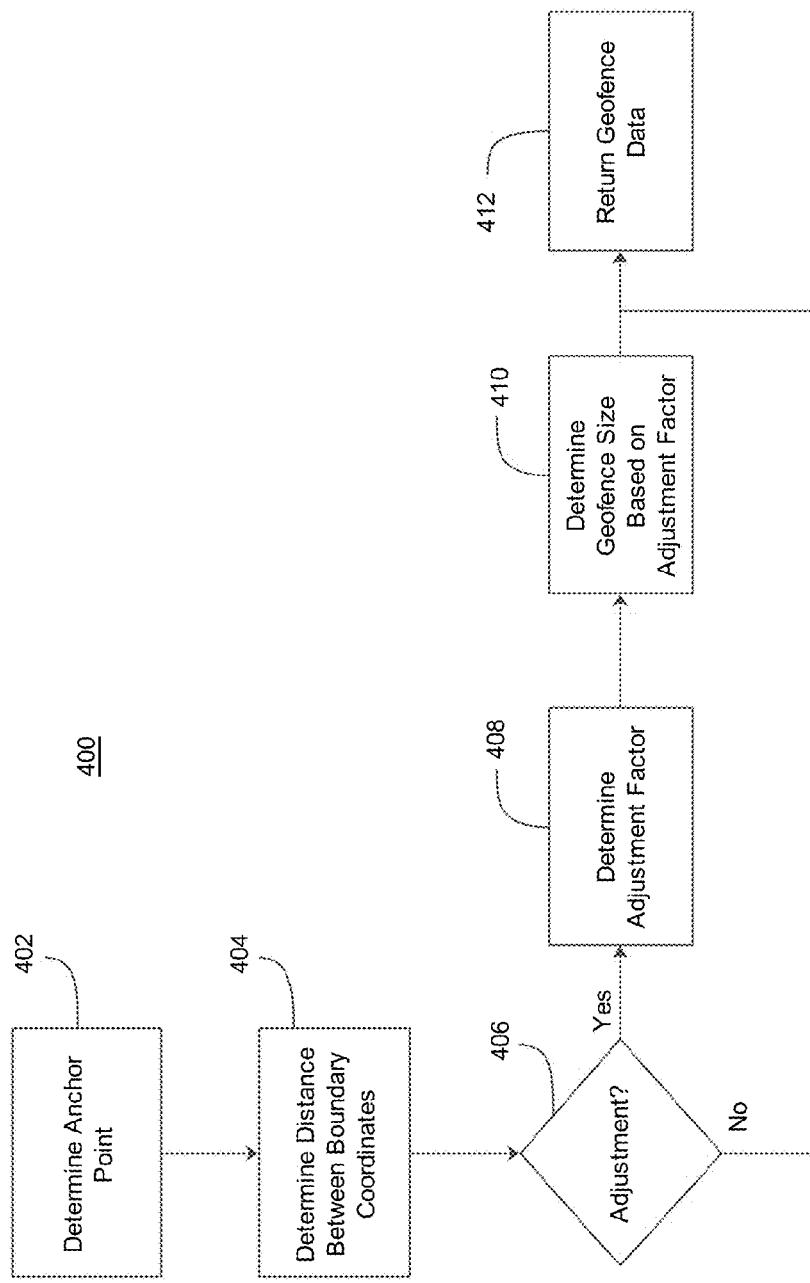
FIG. 4 shows an exemplary process for determining geofence data for a circular geofence.

Referring also to FIG. 4, an exemplary process for determining geofence data for a circular geofence is shown. Once the boundary coordinates 320a and 320b have been determined, the server 40 may determine, based on the at least two boundary coordinates, an anchor point 330 for a geofence 310 at step 402. In some embodiments, the anchor point 330 may be a coordinate between the at least two boundary coordinates, such as a midpoint between the boundary coordinates 320a and 320b. The coordinates of an anchor point 330 may be determined in a number of ways. For example, the coordinates of an anchor point 330 may be determined by averaging the latitudes and longitudes of the boundary coordinates 320a and 320b. For example, a midpoint between the latitude and longitude of boundary coordinates 320a and 320b may be determined by use of the following formulas, in which lat1 and lon1 represent the latitude and longitude of a first boundary coordinate, lat2 and lon2 represent the latitude and longitude of a second boundary coordinate, and latAP and lonAP represent the latitude and longitude of the anchor point 330:

$$latAP = \frac{lat1 + lat2}{2} \quad \text{(Eq. 1)}$$

$$lonAP = \frac{lon1 + lon2}{2} \quad \text{(Eq. 2)}$$

Referring again to FIG. 3b, as noted above, the server 40 has already determined that the boundary coordinates 320a and 320b may be at a latitude of 34.138961 and a longitude of −118.213935 for the Northwest corner 320a of the property and at a latitude of 34.138811 and a longitude of −118.21373 for the Southeast corner 320b of the property. Using equations 1 and 2 above, an anchor point 330 corresponding to the center of the property may be determined to be at a latitude of 34.1388886 and at a longitude of −118.213832.

In some embodiments, the system 10 may take into account the curvature of the Earth when determining an anchor point 330. For example, a midpoint between the latitude and longitude of boundary coordinates 320a and 320b may be determined by use of the following formulas, in which lat1 and lon1 represent the latitude and longitude of a first boundary coordinate, lat2 and lon2 represent the latitude and longitude of a second boundary coordinate, and latAP and lonAP represent the latitude and longitude of the anchor point 330:

$$Bx = \cos(lat2)*\cos(lon2-lon1); \quad \text{(Eq. 3)}$$

$$By = \cos(lat2)*\sin(lon2-lon1); \quad \text{(Eq. 4)}$$

$$latAP = a\ \tan^2(\sin(lat1)+\sin(lat2), \sqrt{\cos(lat1)+Bx)*(\cos(lat1)+Bx)+By^2}); \quad \text{(Eq. 5)}$$

$$lonAP = lon1 + a\ \tan^2(By,\ \cos(lat1)+Bx); \quad \text{(Eq. 5)}$$

Using the above formulas, an anchor point 330 comprising a midpoint between the two boundary conditions may be determined. Referring again to the example shown in FIG. 3b and using the above formulas, an anchor point 330 corresponding to the center of the property may be determined to be at a latitude of 34.1388886 and at a longitude of −118.2138325.

In some embodiments, both sets of calculations may be used depending on factors such as the distance between the boundary coordinates 320a and 320b. For example, if the size of the geofence is less than a predetermined threshold, such as about three (3) miles, equations 1 and 2 may be used to determine the anchor point 330, while equations 3, 4 and 5 may be used to determine an anchor point 330 if the distance between the boundary coordinates 320a and 320b is greater than the threshold. Other calculations also may be used.

2.2. Exemplary Determination of a Geofence Size

Referring again to FIG. 4, the server 40 may determine a geofence size 340 based on the at least two boundary coordinates 320a and 320b at step 404. Different methodologies may be used to determine the size 340 of the geofence 310 depending on a number of factors, such as the shape of a geofence 310 and the like. For example, in some embodiments, the size 340 of a geofence 310 may be the radius 340 of a circular geofence 310 and may be determined by calculating the distance 342 between the at least two boundary coordinates 320a and 320b and dividing it by two.

In some embodiments, the Haversine formula may be used to determine the distance between the boundary coordinates 320a and 320b. The Haversine formula provides great-circle distances between two points on a sphere from their longitudes and latitudes. For example, the distance between the latitude and longitude of boundary coordinates 320a and 320b may be determined by use of the following formulas, in which lat1 and lon1 represent the latitude and longitude of a first boundary coordinate, lat2 and lon2 represent the latitude and longitude of a second boundary coordinate, d represents the distance 342 between the two boundary coordinates 320a and 320b, and r represents the radius or size of the geofence (gs):

$$d = 2r\ \arcsin(\sqrt{hav(Lat2-Lat1)+\cos(Lat1)*\cos(Lat2)*hav(Lon2-Lon1)}) \quad \text{(Eq. 6)}$$

This equation also may be represented as the following:

$$d = a\ \cos(\sin(Lat1)*\sin(Lat2)+\cos(Lat1)*\cos(Lat2)*\cos(Lon2-Lon1)) \quad \text{(Eq. 7)}$$

$$r = gs = d/2 \quad \text{(Eq. 8)}$$

In the example illustrated in FIG. 3b, the server 40 has determined that the boundary coordinates 320a and 320b may be a latitude of 34.138961 and a longitude of −118.213935 for the Northwest corner 320a of the property and 34.138811, −118.21373 for the Southeast corner 320b of the property. Using the above formulas, the server 40 may determine that the distance between the boundary coordinates 320a and 320b is about twenty-five (25) meters and the geofence size or radius 330 may be about 12.5 meters.

In some embodiments, an adjustment factor may be used to determine the size 340 of the geofence 310 to increase the likelihood that the perimeter encompasses as much of the location of interest as possible. In other words, the adjustment factor may improve the accuracy of the geofence 310 and reduce false-positives and/or false-negatives that may result from the differences between the geometry/shape of the geofence 310 and the actual geometry/shape of the location of interest. The adjustment factor may be a multiplier applied to the distance between the boundary coordinates 320a and 320b, may be a predetermined or fixed size, or may be some other value. In some embodiments, the adjustment factor is proportional to the size of the property, meaning a 2-room house will have a smaller adjustment factor than a soccer stadium.

Referring again to FIG. 4, the server 40 may determine if an adjustment factor is necessary at step 406 and, if so, determine an appropriate adjustment factor at step 408. In some embodiments, the adjustment factor may be determined as follows:

1) If the distance between the boundary coordinates 320a and 320b of a given POI is greater than about 500 m, a first adjustment factor may be used to determine the size of a geofence. For example, the first adjustment factor may be between about 76% and about 200% of the distance between the boundary coordinates 320a and 320b, preferably between about 75% and about 150% of the distance between the boundary coordinates 320a and 320b, more preferably between about 80% and about 125% of the distance between the boundary coordinates 320a and 320b, and even more preferably between about 90% and about 110% of the distance between the boundary coordinates 320a and 320b. In some embodiments, the first adjustments factor may be 100% of the distance between the boundary coordinates 320a and 320b, resulting in a geofence having a radius that is equal to the length between the boundary coordinates 320a and 320b;

2) If the distance between the boundary coordinates 320a and 320b of a given POI is between about 100 m and about 499 m, a second adjustment factor may be used to determine the size of the geofence 310. For example, the second adjustment factor may be between about 30% and about 75% of the distance between the boundary coordinates 320a and 320b, preferably between about 40% and about 70% of the distance between the boundary coordinates 320a and 320b, and even more preferably between about 50% and about 65% of the distance between the boundary coordinates 320a and 320b. In some embodiments, the first adjustments factor may be 100% of the distance between the boundary coordinates 320a and 320b of 60% may be used to generate a geofence with a radius that is 60% of the distance between the boundary coordinates 320a and 320b.

3) If the distance between the boundary coordinates 320*a* and 320*b* of a given POI is less than about 100 m, a fixed value may be used for the geofence size. For example, a geofence size may be between about 10 m and about 30 m, preferably between about of 15 m and about 25 m and even more preferably between about 18 m and about 22 m. In some embodiments, a predetermined value of about 20 m may be used to generate a geofence with a radius of about 20 m.

Other thresholds and ranges of adjustment factor values may be used.

Once the adjustment factor is determined at step 408, the size 340 of the geofence 310 may be determined at step 410 and the geofence data may be returned to the requesting device at step 412. Referring again to the example shown in FIG. 3*b* and using the above conditionals to determine an appropriate adjustment factor, a circular geofence for the store at "123 Main St., Los Angeles, Calif." may be determined to have a radius of 20 m because the distance between the boundary coordinates 320*a* and 320*b* is less than 100 m.

Other methodologies may be used to determine an adjustment factor.

3.0 Other Exemplary Geofencing Systems and Methods

Figure 5:
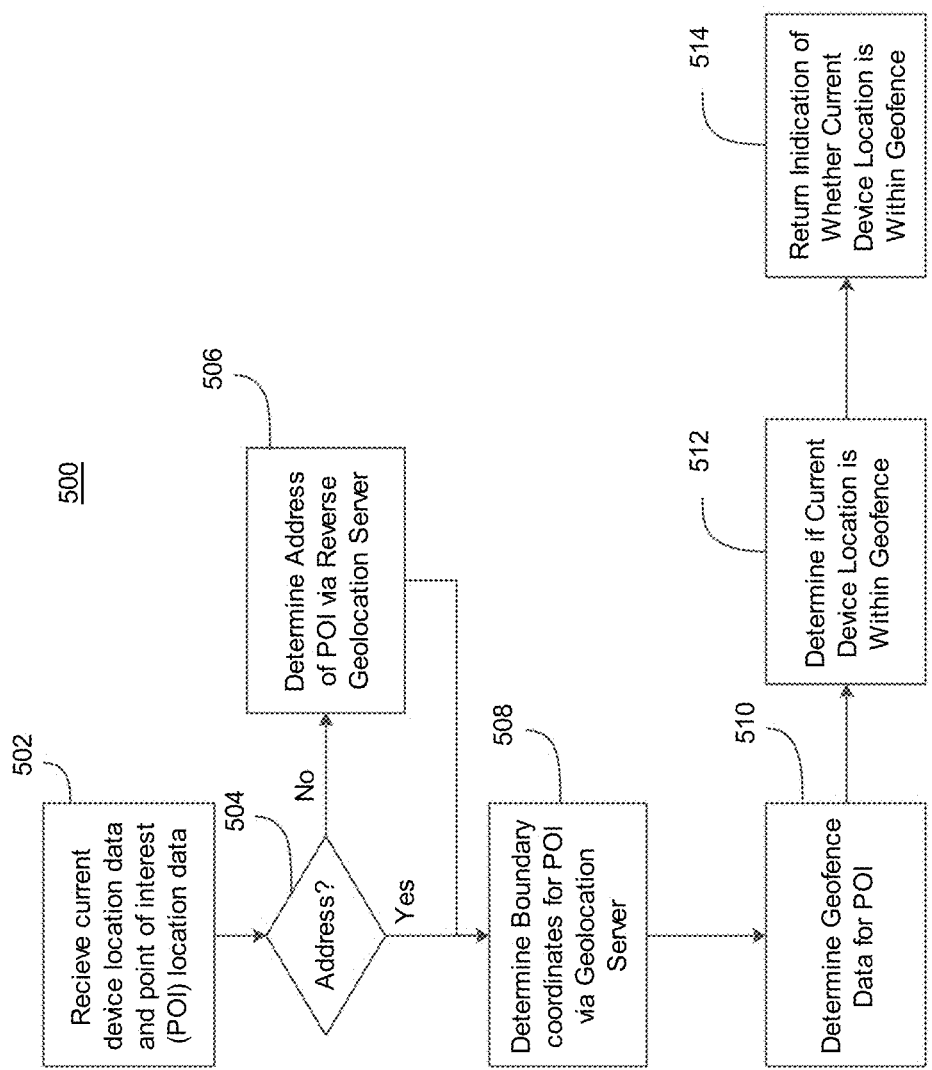
FIG. 5 shows a flowchart for another exemplary process for determining a geofence for an area of interest and determining whether a given location is within the geofence.

Referring to FIG. 5, a flowchart for another exemplary process for determining a geofence for an area of interest and determining whether a given location is within the geofence is shown. Similar to the process described in FIG. 2, the geofencing server 40 may receive location data for an area of interest from a client application 20*a-n* at step 502. In addition, the server 40 also may receive a current location of the requesting device at step 502.

At step 504, the server 40 may determine if the location data is an address or a geographic coordinate, such as a current latitude and longitude for a cellular phone. If the received location data is a geographic coordinate, the server 40 may determine an address associated with the geographic coordinate at step 506. For example, the server 40 may provide the coordinate to a reverse geocoding service 50, and, in response, the reverse geocoding service 50 may return an address. At step 508, the server 40 may determine at least two boundary coordinates for the area of interest based on the address and determine, based on the at least two boundary coordinates, geofence data at step 510.

Next, the server 40 may determine whether the current location of the device is within the determined geofence at step 512. This determination may be made in a number of ways, depending on the geometry of the geofence. For example, as described above, the server 40 may determine if rectangular geofence has been triggered if the device's current location has latitude and longitude values between those of the boundary coordinates 320*a* and 320*b*. An exemplary rectangular geofence 310 is shown in FIG. 3*c*. As another example, the server 40 may determine if a circular geofence has been triggered by determining the distance between the device's current location and the anchor point 330 and comparing that distance to the geofence size 340. If the geofence size is greater than or equal to the distance between the device's current location and the anchor point 330 and comparing that distance to the geofence size 340, the geofence may be considered triggered. Other methods for determining if a device is within or outside a geofence may be used.

Finally, an indication of whether the geofence has been triggered may be returned (transmitted) to the requesting device at step 514.

Figure 6A:
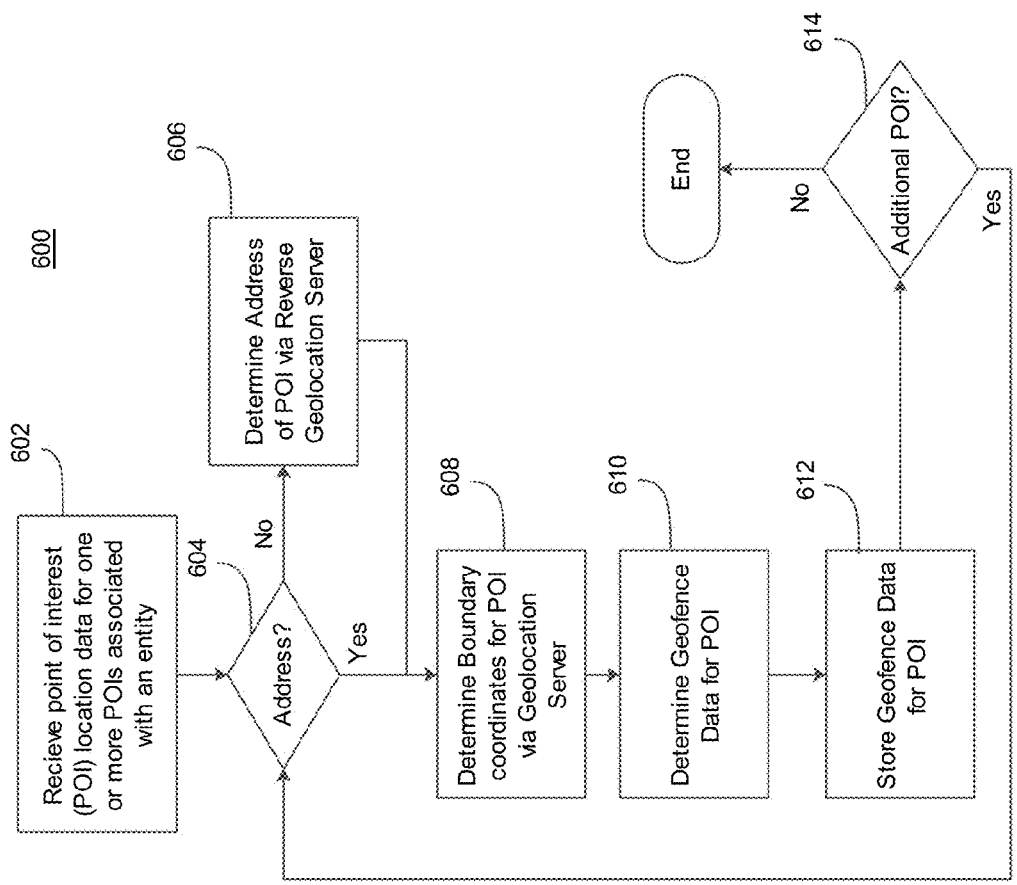
FIG. 6a shows a flowchart for an exemplary process for determining one or more geofence for an area of interest associated with an entity.
Figure 6B:
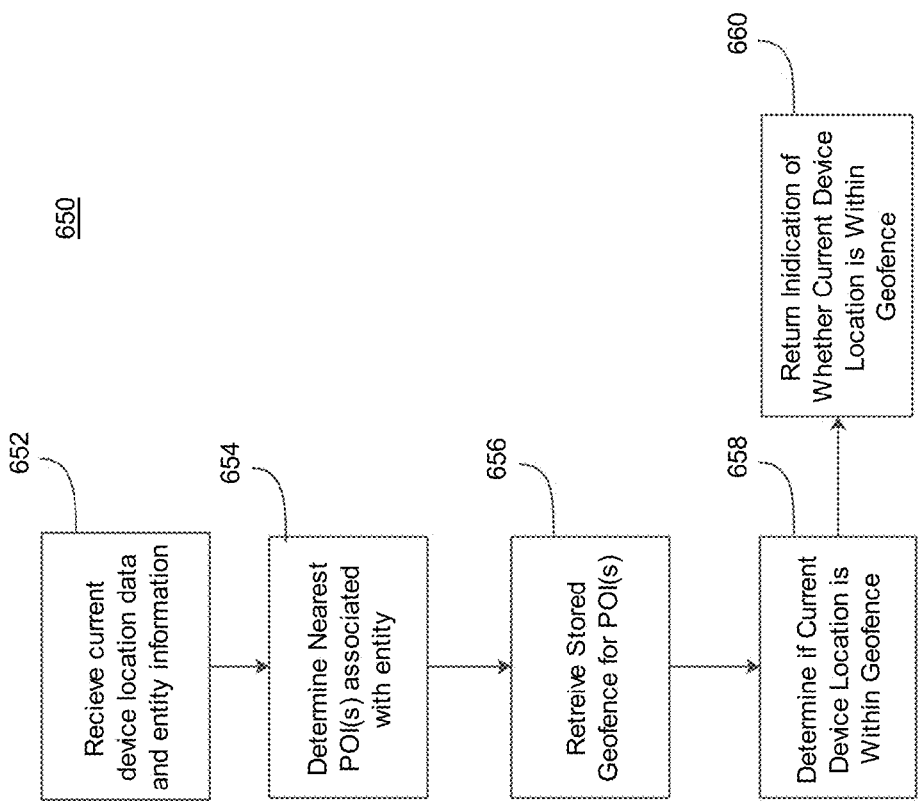
FIG. 6b shows a flowchart for an exemplary process for determining whether a given location is within a geofence associated with an entity.

Referring to FIGS. 6*a* and 6*b*, a flowchart for an exemplary process 600 for determining one or more geofence for an area of interest associated with an entity and a flowchart for an exemplary process 650 for determining whether a given location is within a geofence associated with an entity are shown, respectively. As shown in FIG. 6*a*, the server may receive point/location of interest data for one or more POIs associated with an entity. For example, a list of locations for a fast food chain may be provided to the server. Other types of entities may be used, such as the example entities described below.

At step 604, the server 40 may determine if the location data is an address or a geographic coordinate, such as a current latitude and longitude for a cellular phone. If the received location data is a geographic coordinate, the server 40 may determine an address associated with the geographic coordinate at step 606. For example, the server 40 may provide the coordinate to a reverse geocoding service 50, and, in response, the reverse geocoding service 50 may return an address. At step 608, the server 40 may determine at least two boundary coordinates for the area of interest based on the address and determine, based on the at least two boundary coordinates, geofence data at step 610. This geofence data may be stored at step 612, such as, for example, stored in the database 45. The system may then determine if geofence data for any additional POIs need to be determined at step 614 and, if so, repeat steps 604 through 612 for each additional POI on the list.

Referring to FIG. 6*b*, the geofencing server 40 may receive a current location of the requesting device and entity information at step 652. In response, the server 40 may determine the nearest POI associated with the entity at step 654 and retrieve the stored geofence data for that POI at step 656. Next, the server 40 may determine whether the current location of the device is within the determined geofence at step 658 and return an indication of whether the geofence has been triggered to the requesting device at step 660.

4.0 Exemplary Entities/Use Cases for Geofencing Systems and Methods

Various entities/industries may utilize the geofencing systems and methods described herein. Each of the entities/industries, for example, may implement the system using the methods described above in FIGS. 2, 4, 5 and 6*a-b* and the variations of those methods that would be apparent to one of ordinary skill. For example, using the methods described in FIG. 5 or FIGS. 6*a-b*, the server may receive the current location of a device and either a location data for a POI or an entity designation. In response, the server may determine if the device is within the geofence and provide an indication of the same. In yet another variation, the determined geofence data may be stored on the client device 20*a-n* and the client 20*a-n* may determine if it is currently within a stored geofence(s).

The client 20*a-n* may then utilize this information in a variety of ways. For example, government tracking agencies may use the systems and methods described herein to monitor restraining orders, house arrest, criminal transport, and the like. Medical & private care companies may use the systems and methods described herein to monitor patient transport, organ transport tracking, patient movement and the like. Monitoring and security companies may use the systems and methods described herein to monitor asset transportation (such as people, money, and the like).

As additional examples, delivery retailers that ship heavy volumes of products and may use the systems and methods described herein to monitor deliver, and in particular, for monitoring delivery via drones. Another entity may be companies that ship expensive items (such as jewelers and the like) and desire to put their item in a package that can be more accurately monitored without depending on a human to check it in at each stage of its transportation process.

Parents may use the systems and methods described herein to monitor their children, such as installing a chip in a backpack or the like that automatically sends progress updates to specified users at specific locations. Airlines and luggage carriers may use the systems and methods described herein to monitor various items. This may be particularly useful for people or companies traveling with valuable items. The systems and methods described herein may be used to provide automated updates at predetermined stages of their items' transportation.

Police may use the systems and methods described herein to monitor police vehicles and officer badges to make it easy to monitor the location and activity of officers and fleet vehicles. Agriculture entities may use the systems and methods described herein to generate geofences around specific agricultural areas and be passed on to drones, planes, helicopters to track and monitor fertilizer/pesticide distribution. For example, the systems and methods described herein may be implemented in combines for more accurate land management to increase the likelihood that important areas are efficiently taken care of and the areas that should be avoided are excluded. Research vessels may use the systems and methods described herein to put restriction zones in the ocean and notify crew when a desired area has been reached even if that area has not been explored before. The systems and methods described herein also may be used to mark zones that have been searched vs unsearched areas.

Civil engineering and construction companies may use the systems and methods described herein to monitor assets (such as workers, equipment, machines, materials and the like). Similarly, mining companies may use the systems and methods described herein to monitor and/or map out evacuation zones and notify personnel of any breaches or if any assets are in danger zones. Disaster relief companies may use the systems and methods described herein to generate geofences around disaster zones to show people dangerous areas and to help the relief crews get to the right areas as efficiently as possible.

Music festivals may use the systems and methods described herein (such as be embedding aspects into a chip on a ticket or lanyard) to allow each ticket to have its own geofence and in turn, provide those hosting companies with analytics on their events. Exemplary analytics may include the number of attendees at each stage and for how long they stayed, which areas had the most traffic and at what time(s) of day, the general flow of attendees and the like. For example, heat maps of the event could be generated on an act by act basis.

Similarly, amusement parks could implement similar mechanisms using the systems and methods described herein to monitor wait times for attractions, times between the end of a ride until a customer entered another line, what areas of the park are busiest at what times. These may provide opportunities to reallocate resources to provide a better overall experiences and the like. Other entities and uses also may be used.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system for geofencing, comprising:
a software module for use on a server computer comprising one or more processors and one or more memories, the software module including instructions stored on a non-transitory computer readable medium that:
receive, from a first device, location data for a point of interest;
determine at least two boundary coordinates for the point of interest based on the received location data, where the at least two boundary coordinates correspond to a perimeter of a target area within a property associated with the point of interest;
determine, by the server computer, geofence data for a geofence based on the determined at least two boundary coordinates for the point of interest; and
transmit the geofence data to the first device.

2. The system of claim 1, where the geofence data includes an anchor point for a geofence that is calculated based on the at least two boundary coordinates and a size for the geofence that is calculated based on the at least two boundary coordinates.

3. The system of claim 2, where the at least two boundary coordinates are opposite corners of the point of interest.

4. The system of claim 3, where the anchor point is a coordinate substantially halfway between the at least two boundary coordinates.

5. The system of claim 1, where the location data includes an address for the point of interest and where the software module further includes instructions that query a geocoding service to determine the at least two boundary conditions from the address.

6. The system of claim 1, where the location data includes a specific coordinate for the point of interest and where the software module further includes instructions that query a reverse geocoding service to determine an address for the point of interest from the specific coordinate.

7. The system of claim 6, where the software module further includes instructions that query a geocoding service to determine the at least two boundary conditions from the address.

8. The system of claim 1, where the geofence data includes a geofence size and where the software module further includes instructions that determine an adjustment factor based on a distance between the at least two boundary coordinates and instructions that determine the geofence size based on the adjustment factor.

9. The system of claim 1, where the geofence data is determined using the Haversine formula.

10. A method for determining a geofence, comprising:
receiving target location data for an area of interest;
querying a geolocation service to determine at least two boundary coordinates for the area of interest based on the received target location data;
calculating, by a device, an anchor point for a geofence based on the determined at least two boundary coordinates; and
calculating, by the device, a size for the geofence based on the at least two boundary coordinates.

11. The method of claim 10, where the at least two boundary coordinates are opposite corners of the area of interest.

12. The method of claim 11, where the anchor point is a coordinate substantially halfway between the at least two boundary coordinates.

13. The method of claim 10, where the method further includes querying a reverse geocoding service to determine an address for the area of interest and where querying the geolocation service includes querying the geolocation service for boundary coordinates associated with the address for the area of interest.

14. The method of claim 10, further comprising:
determining an adjustment factor based on the at least two boundary coordinates; and
calculating the size of the geofence based on the adjustment factor.

15. The method of claim 10, further comprising:
receiving, from a first device, current location data of the first device; and
determining if the current location data of the first device is within the geofence.

16. A system for geofencing, comprising:
a software module for use on a mobile device comprising one or more processors and one or more memories, the software module including instructions stored on a non-transitory computer readable medium that:
determine a target location;
determine at least two boundary coordinates for the target location, where the at least two boundary coordinates coincide with a property line for the target location;
calculate an anchor point for a geofence based on the determined at least two boundary coordinates for the target location;
calculate a size for the geofence based on the at least two boundary coordinates;
determine a current location for the mobile device; and
determine if the current location of the mobile device is within the geofence.

17. The system of claim 16, where the software module further includes instructions that determine an adjustment factor based on the at least two boundary coordinates and calculate the size of the geofence based on the adjustment factor.

18. The method of claim 17, where the software module further includes instructions that determine the adjustment factor based on a distance between the at least two boundary coordinates.

19. The system of claim 16, where the software module further includes instructions that notify a third-party service provider if the current location of the mobile device is within the geofence.

20. The system of claim 16, where the at least two boundary coordinates are opposite corners of the area of interest and where the anchor point is a coordinate substantially halfway between the at least two boundary coordinates.

* * * * *